United States Patent [19]

Mariotti

[11] Patent Number: 4,505,193
[45] Date of Patent: Mar. 19, 1985

[54] INDUSTRIAL DEEP-FRYER

[75] Inventor: René G. Mariotti, St. Cloud, France

[73] Assignee: Friteco, Inc., Oakton, Va.

[21] Appl. No.: 623,347

[22] Filed: Jun. 22, 1984

Related U.S. Application Data

[63] Continuation of Ser. No. 356,809, Mar. 10, 1982, abandoned.

[30] Foreign Application Priority Data

Mar. 13, 1981 [FR] France .................................. 81 05027

[51] Int. Cl.³ ............................................. A47J 37/12
[52] U.S. Cl. ........................................ 99/330; 99/334;
99/356; 99/357; 99/407; 99/408; 426/438
[58] Field of Search ................. 99/356, 403, 357, 334;
426/438–441

[56] References Cited

U.S. PATENT DOCUMENTS

| | | | |
|---|---|---|---|
| 3,245,800 | 4/1966 | Sanders | 426/439 X |
| 3,431,834 | 3/1969 | Keathley | 99/330 X |
| 3,431,835 | 3/1969 | Angold | 99/408 |
| 3,861,286 | 1/1975 | Albright | 99/330 X |

*Primary Examiner*—Billy J. Wilhite

[57] ABSTRACT

The invention relates to an industrial deep-fryer adapted for cooking successive proportioned amounts of frozen foods. It comprises unique means for filling and draining off the deep-fry pan, a hermetically closed deep-fry pan, proportioning means and a cup distributor.

16 Claims, 8 Drawing Figures

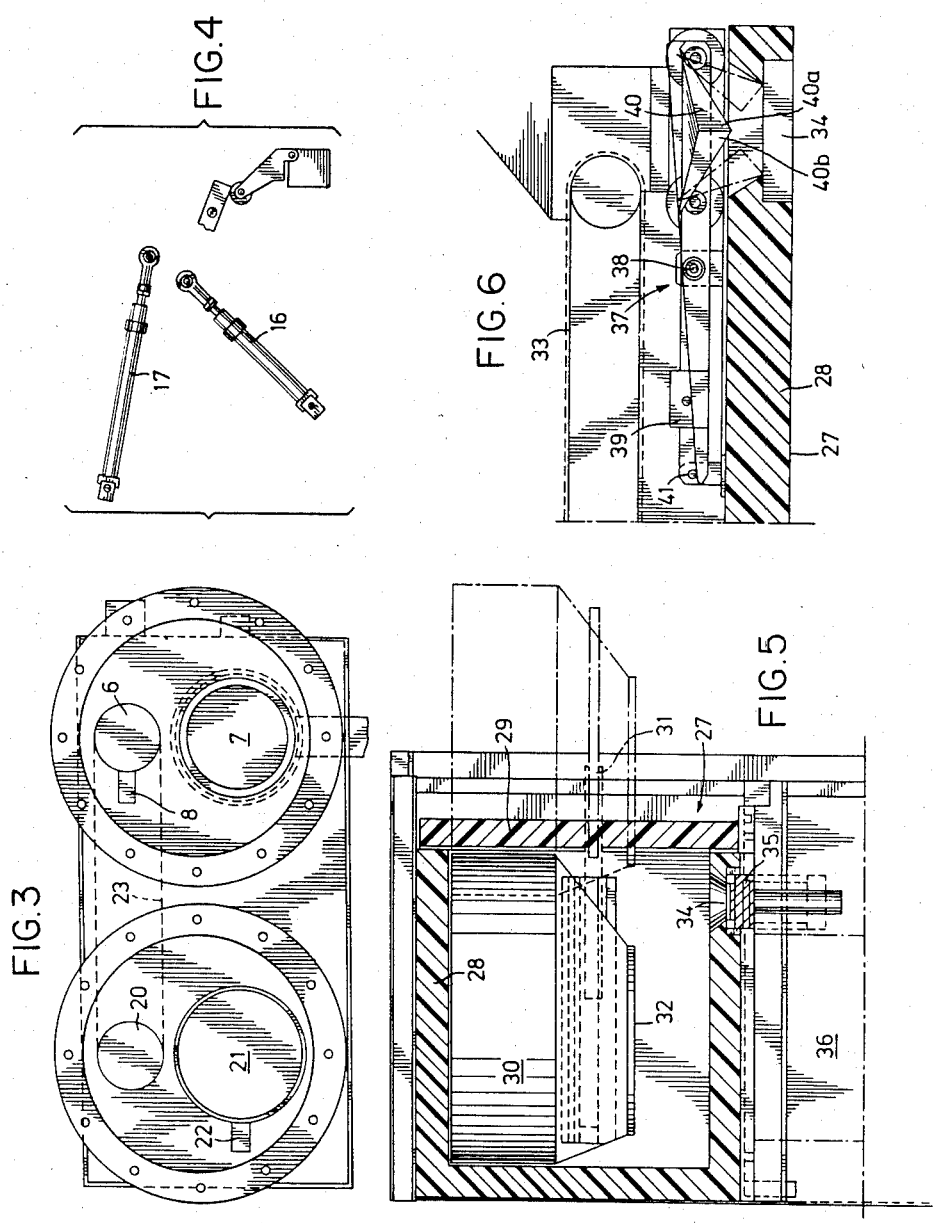

INDUSTRIAL DEEP-FRYER

This is a continuation of application Ser. No. 356,809 filed Mar. 10, 1982, now abandoned.

The present invention relates to an industrial deep-fryer, adapted more especially for cooking successive proportioned amounts of frozen foods consumable after frying and the distribution thereof into cups.

The deep-fryer of the invention may in particular be constructed in the form of a machine, operated by introducing a coin or a token, for distributing on request fried foods, extemporaneously. These may be chips or any other foods able to be frozen and cooked by frying, such as fishcakes, fritters etc. ...

Industrial deep-fryers of the above-mentioned type already exist. They have scarcely met with commercial success because of the disappointing results obtained with them, this for different reasons connected more particularly with exposure of the frying oil to the air, to light and to high temperatures, the presence in this oil of scraps of food burned to an increasing degree, the method of proportioning the frozen foods which often causes unfreezing of these foods before frying and crushing of these foods in the proportioning device, without speaking of a great unevenness in the proportions supplied and distribution defects affecting the cups intended to collect these portions once cooked.

The deep-fryer of the invention eliminates all these disadvantages. The fundamental problem which must be resolved for these deep-fryers was to maintain the frying oil in the best possible condition, which has been achieved by feeding the oil into the frying pan only at the moment when cooking is required and by emptying the pan immediately afterwards, the oil coming from and returning, after filtration, to an air-tight reservoir.

More precisely, the Applicant has thus perfected a process for filling the pan with oil and for removing this oil after use, which process consists in applying:

for filling, a pressure on the surface of the oil contained in the reservoir while allowing the oil thus displaced to leave said reservoir towards the pan and to enter this latter through a one-way passage, and for emptying, a depression on the surface of the oil contained in said reservoir while allowing the oil previously fed into the pan to leave only through a filtering device.

In practice, the deep-fryer of the invention comprises then:

an air-sealed oil reservoir forming a cylinder and having a piston, said reservoir being provided with an oil discharge opening and an oil readmission opening having valving means which only open under the effect of a negative pressure inside the reservoir;

a deep-frying pan having an oil supply opening, provided with valving means which only open under the effect of a positive pressure outside the pan and an oil removal opening provided with filtering means;

a first duct connecting the discharge opening of the reservoir and the supply opening of the pan, and a second duct connecting the removal opening of the pan and the readmission opening of the reservoir.

To further protect the oil, it is preferred that the reservoir be not only sealed to the air but also to the light and that the pan form an hermetically sealed enclosure.

Thus, the oil is protected to a maximum from degrading factors (oxygen, ultra-violet rays, high temperatures etc. ... ) because of its being stored in a reservoir separate from the frying pan and because, even during frying, the amount of oil exposed to the air included in the closed pan is only exposed for a short period of time before being remixed with the quantity of oil, of much greater volume, contained in the reservoir. Furthermore, the reservoir oil is not contaminated by food scraps which may have escaped from the basket during cooking, for these scraps are filtered out by a filtering device placed in the return path between the pan and the reservoir.

In machines of the type considered, the frozen foods to be fried are stored in a thermally insulated compartment and maintained at an appropriate temperature and, channelled by a hopper, they fall either into a hollow measure in a cylinder stopping up the opening of the hopper, in which case the proportioning of each portion is volumetric, or on to the scale of a balance, in which case the proportioning is by weight.

It is to this second type that the machine of the invention belongs.

More precisely, the unit for conserving frozen foods and proportioning successive portions of these foods comprises a thermally insulated closed compartment maintained at an appropriate temperature, which compartment comprises:

a frozen container opening on to conveyor means;

conveyor means collecting the foods coming from the container and feeding them to the receiving scale of a balance;

a balance whose scale receiving products to be weighed comprises discharge means which open above an aperture formed in the wall of the compartment;

means controlling the advance of the conveyor means in response to indications supplied by the balance; and means controlling the operation of the means for discharging the receiving scale of the balance, in response to external solicitation.

In a preferred embodiment, the receiving scale of the balance is in the form of a dish whose bottom is formed by bringing together the free edges of separate elements forming said dish, these elements being pivotably mounted so as to be able to move closer together (weighing position) or to move away from each other (position for discharging the weighed portion).

Thus, the weighed foods fall naturally through the open bottom of the dish and cannot be crushed by any moving part.

In an embodiment of the deep-fryer of the invention, the frying pan is formed by an hermetically sealed enclosure comprising a lateral door for loading and unloading the perforated basket adapted to dipping the foods in the oil in the pan, this perforated basket being extended at its upper part, on the door side, by a deflector integral with said door so that opening of the door exposes at least part of the deflector to the outside of the enclosure.

Advantageously, the bottom of the deflector is coextensive with the door and the bottom of the door is pivotably mounted on the wall of the enclosure. Thus, the frying pan only opens outwardly for loading and unloading the basket, while it still does not contain or no longer contains any oil. The movement of the basket is connected to that of the door, which does away with any special mechanism for taking the basket out of the pan.

In known deep-fryers, the open pan is included in a cabinet which comprises means for circulating air between an air inlet and outlet formed in the walls of said cabinet, with a filtering device placed therebetween in the air outlet circuit.

Ventilating means sucks in the ambient air, causes it to flow in the vicinity of the oil during use and discharges it into the atmosphere. The result is inevitable pollution, because the volume of air handled is high and because the filtering device is generally insufficient.

According to the invention, downstream of the filtering device, the air circuit is connected to the air inlet.

Thus, the volume of air in which the frying takes place is not discharged into the atmosphere: it flows in a closed circuit, while the greases which it conveys are removed therefrom after having passed over the surface of the frying oil, by the filtering device. In this case, the filtering is efficient for the volume of air treated is small. Water vapor coming from the foods during frying is condensed outside the pan and discharged before the air is recycled.

It is not indispensable for the filtering device to remove the odors with which the air flow may be charged since these odors are greatly reduced by the care taken in conserving the oil and since, in any case, they are only perceptible inside the closed pan.

During unloading of the basket, the fried foods fall into a cup. The deep-fryer may then be provided with a cup distributing unit. Such a unit generally comprises a cup reservoir containing at least one column of cups stacked inside each other, retractable means for retaining said cups cooperating with the lip of the lower cup of the column, means controlling the retraction of the retaining means so as to free the cups one by one from the column, a duct receiving and guiding the freed cup and a tray supporting the cup ready for use.

To avoid having to refill the apparatus with cups too often, it is advantageous to provide a reservoir having at least two columns of cups and to release alternately a cup from one column then from another.

To this end, in accordance with the invention, for a pair of columns, the retractable means comprise on two opposite sides of the cups, on the one hand, two tongues movable along the same horizontal line and, on the other hand, a bar movable over another lower horizontal line, the lower face of the tongues being spaced apart from the upper face of the bar by a height at least equal to that of the lip of the cups, the relative position of the tongues and the bar being such that, at rest, the bar supports the lip of the last cup of the first column whereas the second tongue supports the lip of the last cup of the second column, said control means being operable in a first stage, to move the bar out the natural fall path of the cups of the first column and to bring it into a position interrupting the natural fall path of the cups of the second column, whereas, driven with the same movement, the first tongue retains the cup of the first column following the one which has just been released and the second tongue comes out of the fall path of the cups of the second column, while releasing a cup which is retained by the bar and so that, in a second stage, they move the bar and the tongues in the opposite direction, while freeing the last cup of the second column.

With the structure proposed by the invention, each cup is separated from the immediately following cup of the stack by a pair of tongues, situated on each side of said cup, which, after separation, is only stopped from falling by the bar. Thus, the cups fall one by one into the receiving and guiding duct, in order to be placed on the support tray. In this position, the cup is in the fall path of the fried foods falling from the basket when the door of the frying pan occupies its endmost open position.

Advantageously, part of the lateral wall of the receiving and guiding duct, integral with the access door, is movable between a closed position and an open position. In the closed position, the cup is accessible to the user.

One embodiment of the invention is described hereafter by way of non limiting example, with reference to the accompanying drawings in which:

FIG. 3 is a top view of the ducts connecting together the oil reservoir and the pan;

FIG. 4 shows the positioning of the jacks controlling the opening of the door of the pan;

FIG. 5 shows in section the unit for conserving and distributing frozen foods;

FIG. 6 shows in section the means for proportioning the frozen foods; and

The deep-fryer of the invention comprises principally:

a frozen food conserving and distributing unit (FIG. 5), comprising:
means for proportioning successive portions of foods (FIG. 6), which weighs a specific amount of foods and causes them to fall into a deep-fry basket equipping
a deep-fry pan 2 (FIG. 1), supplied with oil from
an oil reservoir 3 (FIG. 1),
a cup distributing unit (FIG. 7) delivering cups 4 which collect the fried foods during unloading of basket 1.

These different component elements and the operation thereof will be described hereafter, beginning with the "deep-fryer" part properly speaking.

Figure 2:
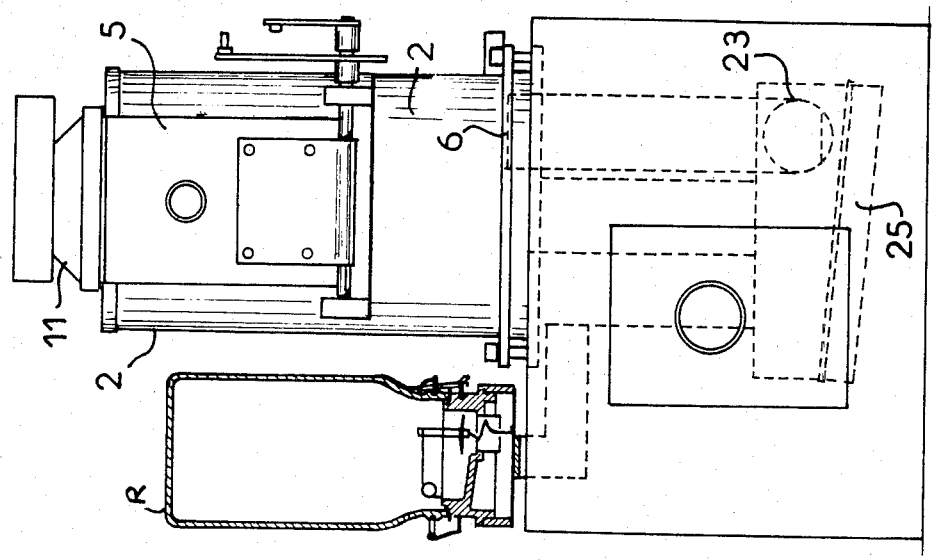
FIG. 2 is a side view of the assembly of FIG. 1.
Figure 1:
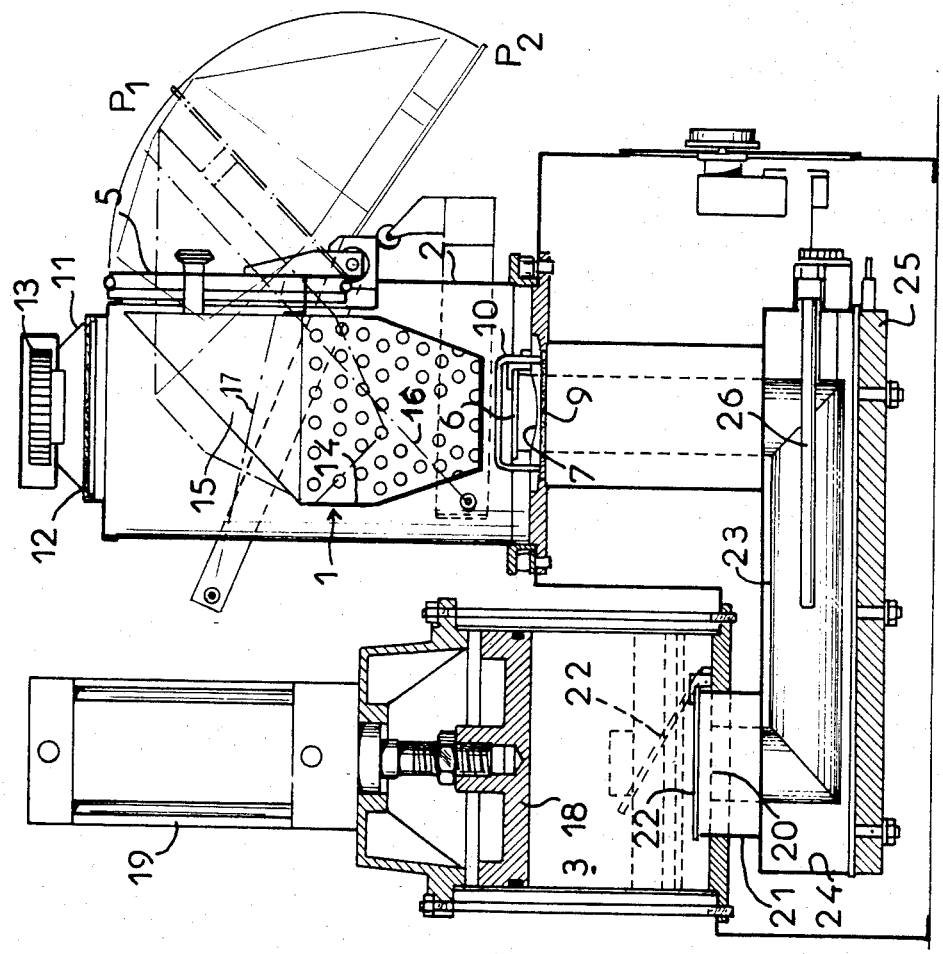
FIG. 1 is a section of the deep-fry pan/oil reservoir assembly of the deep-fryer.

As can be seen in FIGS. 1 and 2, the deep-fry pan 2 forms a closed enclosure accessible from the outside through a door 5. The contact zone between door 5 and the opening of the pan which this door 5 closes off is fitted with a silicon seal. The bottom of the pan comprises an oil supply opening 6 and an oil removal opening 7 clearly visible in FIG. 3. The oil supply opening 6 is provided with a valve 8 which only opens under the effect of a positive pressure exerted from outside pan 2. A filtering device 9 having a handle 10 for removal thereof, is disposed on the removal opening 7. At its upper part, the deep-fry pan 2 is provided with an air suction hood fitted with a replacable grease filter 12 and it is connected to a turbine 13. The output of turbine 13 is connected to an aperture (not shown) provided half way up pan 2. In the connecting duct (also not shown) there is placed a water vapor condensation and condensate removal device. Pan 2 contains a deep-fry basket 1 whose bottom 14 is made from an open latticework. On the same side as door 5, the basket is extended by a stainless steel solid part forming deflector 15. The flat bottom of this deflector 15 is coextensive with door 5 and is fixed thereto. Thus, basket 1 is integral with door 5. The bottom of door 5 is pivotably mounted on the wall of pan 2. A pair of jacks 16 and 17 (FIG. 4) control the opening of door 5. Jack 16 moves it between its closed position and position P1 (FIG. 1) and jack 17 between this position P1 and position P2 (FIG. 1). When door 5 is closed the silicon seal is crushed in a housing provided for this purpose under the action of the pressure exerted by jack 16.

The oil reservoir 3 is in the form of a cylinder in which slides a piston 18 subjected to the action of a jack 19. The bottom of reservoir 3 is provided with an oil discharge opening 20 and an oil readmission opening 21 provided with a valve 22 which only opens uinder the effect of a negative pressure inside reservoir 3. The oil discharge opening 20 of reservoir 3 is connected by a duct 23 to the oil supply opening 6 of pan 2 and the oil removal opening of pan 2 is connected by a duct 24 to the oil readmission opening 21 of reservoir 3.

Duct 23 is included in duct 24 which forms a sleeve and whose base is provided with electric heating means adapted to heat the oil to the desired deep-fry temperature, adjusted by means of a thermostat 26. A safety thermostat (not shown) is also provided for interrupting the heating in the case of over-heating.

The oil level in reservoir 3 is maintained constant by means of an appropriate reserve R (FIG. 2).

If we now refer to FIGS. 5 and 6, it can be seen that the unit for conserving and proportioning the frozen foods is formed by a compartment 27 provided with thermal insulation 28. Refrigerating means 36 are provided, adapted to maintaining a temperature suitable for conserving the frozen foods, such as $-18°$ C., compartment 27 opens through a lateral door 29 which allows a storage container 30 to be removed therefrom. This container 30 slides in appropriate slides 31. The base of container 30 forms a hopper 32 whose aperture opens above a conveyor belt 33 (FIG. 6).

A food removal opening 34 is formed in the base of enclosure 27. This opening 34 can be closed by means of a pivotable trap 35.

There is provided in compartment 27 a balance 37 whose beam pivoting about axis 38 is provided, on one of its arms, with a counterweight 39 and, on the other of its arms, with a receiving scale 40.

The counterweight is chosen depending on the weight of frozen foods forming a portion. On the arc described by the end of the arm carrying the counterweight are provided switch means 41 acting on the circuit controlling the advance of the conveyor belt 33.

The receiving scale 40, which is straight under one of the ends of conveyor belt 33, is formed in two parts 40a and 40b able to move toward or away from each other. In the closed up position, they form a recipient for the foods falling from the conveyor belt 33. Their moving away is controlled by external solicitation, such as the introduction of a coin into an appropriate control device.

Opening 34 of the enclosure 27 is situated directly in line with deflector 15 of basket 1 when door 5 occupies position P1.

Position P2 directs this same deflector towards a cup 4 (FIG. 7) resting on a support tray 42. This cup 4 comes from the cup distributing unit which will now be described.

Figure 7:
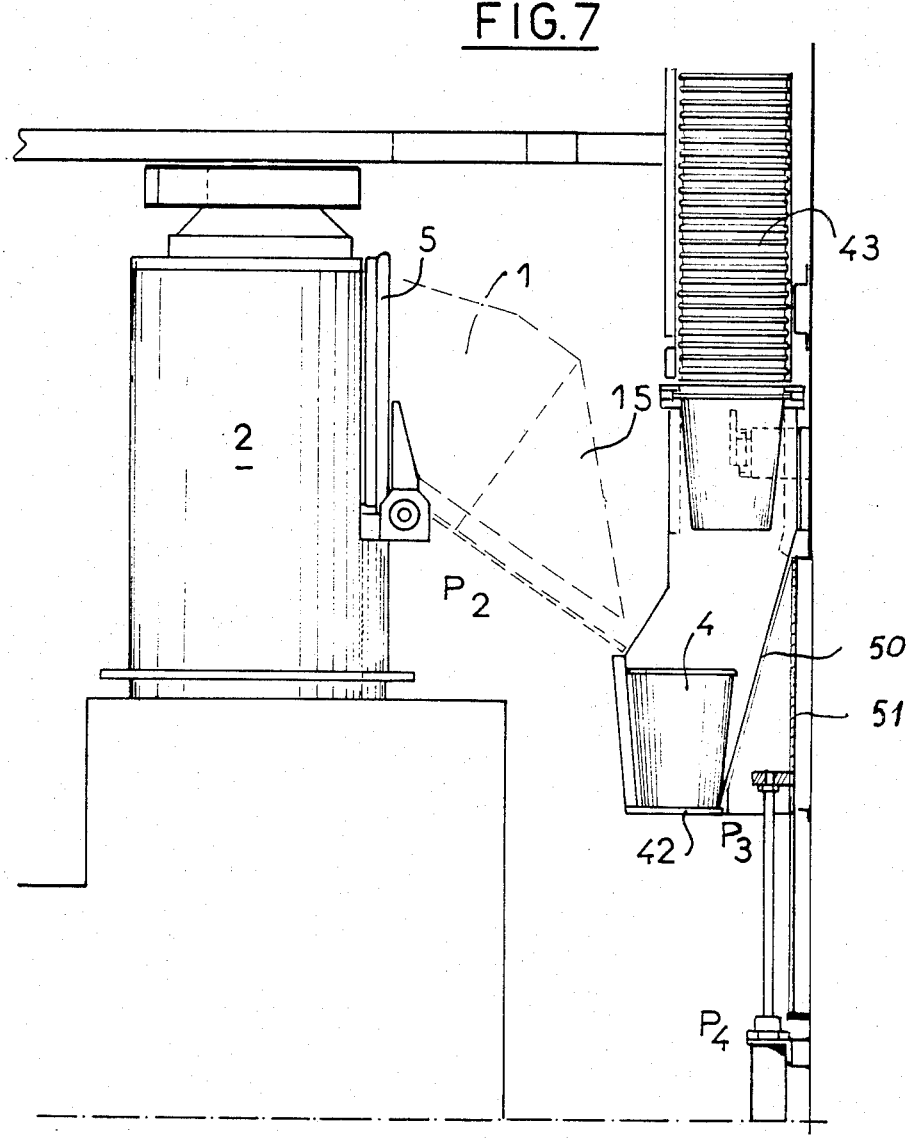
FIGS. 7 and 8 shows respectively from the side and from the front the cup distributor.
Figure 8:
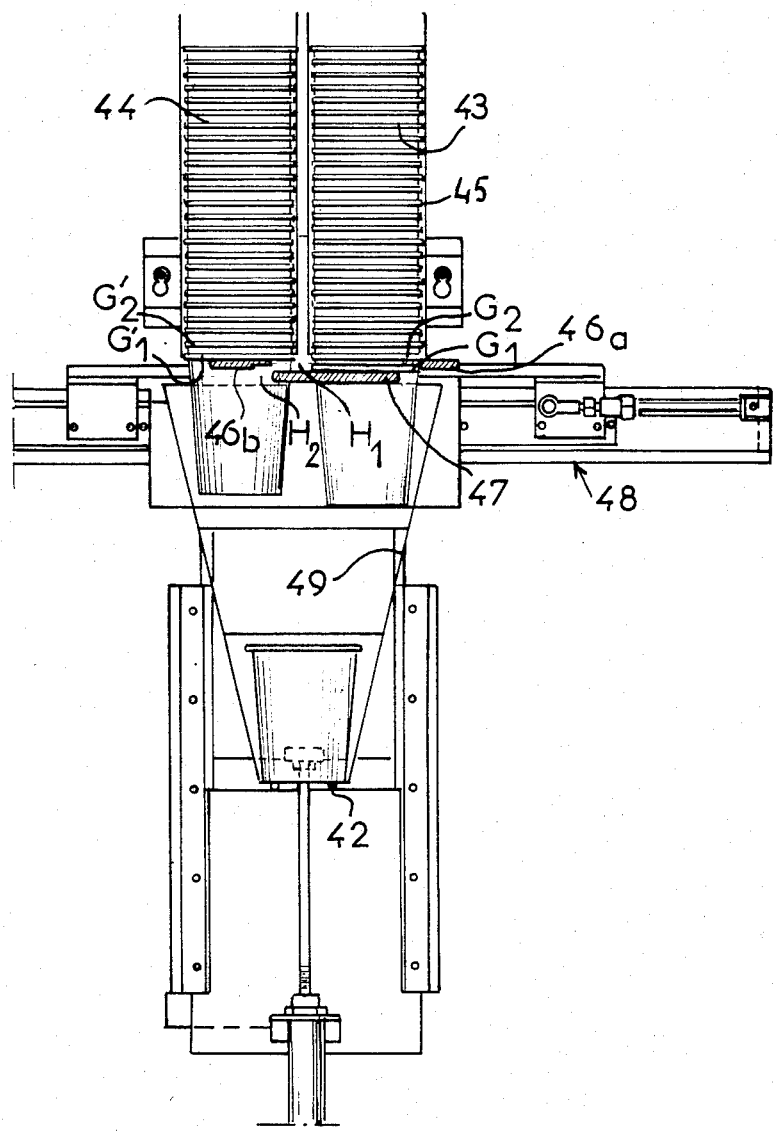

Referring to FIGS. 7 and 8 it can be seen that the cups are stacked in two columns 43 and 44. They are prevented from falling by separation and retention means supporting them under their lip 45. More precisely, there are provided on each side of the cups tongues 46a and 46b and a bar 47. An appropriate mechanism moves the tongues along the horizontal line $H_1$ and the bar along the horizontal line $H_2$. The distance separating the lower face of tongues 46a and 46b from the upper face of bar 47 is at least equal to the thickness of the lip 45 of the cups. The leading edge of tongues 46a and 46b is shaped so as to facilitate penetration of these tongues between two lips of successive cups in the stack. Bar 47 supports the last cup G1 of column 43, whereas the last cup G'1 of the other column 44 is supported by tongue 46b and the other tongue 46a provides separation beteen cup G1 and the immediately following cup G2.

When mechanism 48 is actuated, bar 47 is pushed back under column 44, while releasing cup G1 which falls into the guiding and receiving duct 49 and occupies the position indicated by cup 4. Simultaneously, tongues 46a and 46b are pushed back in the same direction as bar 47: tongue 46a thus supports the lip of cup G2 whereas tongue 46b releases cup G'1 whose lip abuts against the bar 47 occupying its new position. For releasing the next cup G'1, tongues 46a and 46b and bar 47 are brought back towards the right whereby bar 47 and tongue 46a leave respectively the fall path of the cups of columns 44 and 43, whereas the bar 47 and tongue 46b now support respectively the last cups G2 and G'2.

As can be seen from FIGS. 7 and 8, the tray 42 supporting cup 4 forms the end of the guiding and receiving duct 49. This duct 49 comprises a part 50 integral with an access door 51 movable between a closed position P3 and an open position P4, in which the cup 4 is accessible to the user.

The operation of the deep-fryer is as follows:

Between two uses, a previously weighed food portion is ready on the receiving scale 40 of the balance inside the conservation and proportioning unit. The deep-fry pan 2 is closed and empty. Piston 18 of the oil reservoir is at the top of its travel and the oil fills duct 23. The electric heating means 25 are on, maintaining this oil at a temperature of the order of 180° C.

A cup G1 held back by bar 47 is ready to fall.

When the user desires a food portion, he operates the different mechanisms of the deep-fryer, either by pressing a button or by inserting a coin or a token into an appropriate device.

The piston then moves down into reservoir 3 discharging oil into duct 23. Under the effect of the pressure, valve 8 of the supply opening opens and a quantity of oil at 180° C. is fed into the deep-fry pan 2. A the end of travel of piston 18, there is not further pressure exerted and valve 8 closes again. At the same time as the piston, turbine 13 was actuated, and it causes the air to circulate in a closed circuit while fitering it as it passes therethrough.

Simultaneously, jack 16 pushes door 5 back to position P1 while tilting basket 1 so that its deflector 15 comes in line with the opening 34 of the food conservation unit 27. The trap 35 then pivots and lets fall into basket 1 the food portion which the receiving scale 40 of the balance supported up to now. The two parts 40a and 40b of this scale move apart, in fact, at the same time as the trap opens. Jack 16 closes door 5 again while plunging at the same time basket 1 and its contents into the deep-fry bath.

The external solicitation also operates mechanisms 48 which moves tongues 46a, 46b and bar 47 to release a cup 4 which comes into position on the support tray 42.

After about 40 seconds, the cooking is finished; piston 18 moves up again while drawing the deep-fry oil through the filtering device 9 covering the removal opening 7 of pan 2, the oil passes into duct 24 and is readmitted into reservoir 3 through the opening 21 by pushing back valve 22.

During emptying of pan 2, the fried foods are drained. Jack 16, then jack 17, push door 5 back to position P2. The fried foods then fall from basket 1 into cup 4.

While jack 17, then jack 16 close door 5 again, the part 50 of the guiding and receiving duct 49 as well as access door 51 are lowered, which allows the user to take the cup filled with a portion of fried foods.

During this time, the circuit of the conveyor belt 33 has been switched on, frozen foods have fallen into the receiving scale 40 of balance 37 to the amount determined by counterweight 39. When the desired weight is reached, conveyor belt 33 is stopped, a new frozen food portion remaining ready on the receiving scale 40.

Once the cup has been taken by the user, the mobile part of the guide duct 49 and door 51 fall back again into position P3 and turbine 13 stops.

The deep-fryer may then be actuated again.

I claim:

1. A self-contained deep-fryer for frying food portions to be consumed after frying in oil comprising:
   an oil reservoir having an oil discharge opening and an oil readmission opening, and valve means to permit flow of oil through said readmission opening in response to a negative pressure in said reservoir,
   a deep fry pan having an oil supply opening and an oil removal opening;
   valving means to permit flow of oil through said supply opening in response to positive pressure outside said pan;
   a first duct connecting said discharge opening and said supply opening;
   heating means associated with said first duct for producing in said first duct a buffer of heated oil;
   a second duct connecting said oil removal opening and said oil readmission opening;
   piston means in said oil reservoir displaceable in a first direction to create a positive pressure outside said pan to thereby supply oil from said reservoir to said first duct and said buffer of heated oil in said first duct to said pan to fry food therein without supplying additional heat to the oil in said pan, and displaceable in a second direction to create a negative pressure in said reservoir to return used oil from said pan to said reservoir via said second duct without mixing with the oil in said first duct; and
   a filter in the oil path between said oil removal opening and said oil supply opening to filter used oil prior to the introduction thereof into the deep fry pan.

2. A deep fryer as in claim 1 wherein said pan is a hermetically sealed enclosure at a pressure substantially equal to atmospheric pressure.

3. A deep-fryer as in claim 1 further including:
   a thermally insulated closed refrigeration container for storing and maintaining said food at an appropriate temperature;
   conveyor means for receiving portions of refrigerated food from said container;
   a balance for receiving refrigerated food to be weighed and for discharging a refrigerated food portion into said fry pan when the weight thereof is a predetermined value, and
   means for controlling the advance of said conveyor means in response to the weight of food delivered to said balance.

4. A deep-fryer as in claim 3, wherein said balance includes a scale pan having a pair of pivotably mounted elements which move from a first to a second position to discharge said food.

5. A deep-fryer as in claim 1 wherein:
   said fry pan is formed as a closed enclosure having an opening and including a door mounted for movement between a closed position sealing the opening, and at least one open position for receiving food to be fried and for discharging fried food;
   a frying basket mounted in said enclosure and movable with said door for holding food during frying, said basket directing a refrigerated food portion thereinto when said door is in an open position and said basket being positionable to discharge fried food when said door is in an open position.

6. A deep fryer as in claim 5 further including:
   means for holding a plurality of stacked cups and individually releasing the lowermost cup; and
   means for positioning a released cup for receiving fried food discharged from said basket.

7. A deep-fryer as in claim 6 wherein said holding and releasing means includes:
   a bar mounted for horizontal movement between first and second positions,
   means for supporting first and second stacks of cups side by side, and
   a plurality of tongues on said bar for engaging said stacks so that, when said bar moves from said first to said second position, a cup of said first stack is released and, when said bar moves from said second to said first position, a cup of said second stack is released.

8. A deep-fryer as in claim 6 wherein:
   said positioning means includes means movable from a first position to a second position permitting manual removal of a cup with fried food therein.

9. Apparatus for vending freshly cooked deep-fried foods, comprising:
   a deep-fry pan for cooking food and having at least one oil transfer port therein for receiving hot cooking oil and for discharging said cooling oil after deep-frying is completed, said deep-fry pan being closed during the cooking of foods therein;
   thermally insulated food storage means for storing and maintaining refrigerated food at an appropriate temperature;
   a food dispenser for delivering a given food portion from said food storage means to said deep-fry pan; and
   a cooking oil supply system including oil heating means for heating a predetermined quantity of oil sufficient in volume and temperature to cook said delivered food portion,
   an oil retention chamber,
   oil transfer means operable to transfer said predetermined quantity of heated oil from said heating means to said deep-fry pan prior to cooking and to transfer used cooking oil from said deep-fry pan to said oil retention chamber at the conclusion of cooking for subsequent reuse thereof, such transfer occurring in paths without mixing the heated cooking oil with the used cooking oil, and
   means for filtering the used cooking oil prior to reheating thereof.

10. Apparatus according to claim 9, wherein said oil transfer means comprises:
a piston pump coupled to said oil retention chamber and said heating means for withdrawing said predetermined quantity of oil from said chamber and delivering said predetermined quantity of oil to the heating means.

11. Apparatus according to claim 10, wherein:
said heating means is communicable with said deep-fry pan such that the delivery of said predetermined quantity of oil to said heating means causes a like quantity of heated cooking oil to be transferred to said deep-fry pan.

12. Apparatus according to claim 10, wherein:
said deep-fry pan is communicable with said oil retention chamber, whereby withdrawal of said quantity of oil from said retention chamber permits used cooking oil to transfer from said frying pan into said retention chamber.

13. Apparatus according to claim 9, wherein said oil transfer means comprises:
a pump including a reservoir communicable with said oil retention means and said heating means,
a pump piston in said reservoir displaceable in a first direction to load cooking oil into said reservoir, and in a second direction to pump oil out of said reservoir, and
valving means in the oil transfer paths between said pump and said deep-fry pan whereby, when said piston moves in the first direction, oil is transferred from said deep-fry pan to said retention chamber and from the latter into said pump reservoir and, when said piston moves in the second direction, oil is transferred from said pump to said heating means and from the latter to said deep-fry pan.

14. Apparatus according to claim 13, wherein:
said pump piston displaces in said first direction at the start of cooking and displaces in said second direction at the conclusion of cooking.

15. A self-contained apparatus for vending freshly cooked deep-fried foods to be consumed after frying, comprising:
a deep-fry pan for deep-frying individual food portions upon demand by a consumer, said deep-fry pan including an opening therein for admitting a food portion to be cooked and for permitting such food portion to be discharged following cooking thereof;
closure means for sealing said deep-fry pan opening during cooking;
a thermally insulated food storage container for storing and maintaining refrigerated food at an appropriate storage temperature;
a food dispenser for delivering a given quantity of food from said food storage container to said deep-fry pan through said sealable opening therein;
a cooking oil retention duct for receiving used cooking oil from said deep-fry pan and for retaining a predetermined quantity of oil at least sufficient to cook one food portion;
an oil heating duct for preheating said predetermined quantity of cooking oil to a temperature sufficient for deep frying at least one food portion without the supply of additional heat;
oil transfer means for transferring used cooking oil from said deep-fry pan to said retention duct at the conclusion of cooking and for transferring, prior to cooking, said predetermined quantity of oil from said retention duct to said heating duct, preheated oil from said heating duct being transferred to said deep-fry pan without mixing with the used cooking oil previously removed therefrom;
filter means for filtering cooking oil transferred to said heating duct; and
means for delivering said cooked food portion from said fry pan to a dispensing receptacle accessible to the consumer.

16. The self-contained vending apparatus of claim 15, wherein:
said means for dispensing said cooked food portion to a dispensing receptacle includes a frying basket for holding food during frying thereof in the hot oil,
said basket being controllably movable from a frying position within said fry pan to a dispensing position in which said fried food portion may be discharged therefrom by gravity.

* * * * *